Patented Apr. 30, 1940

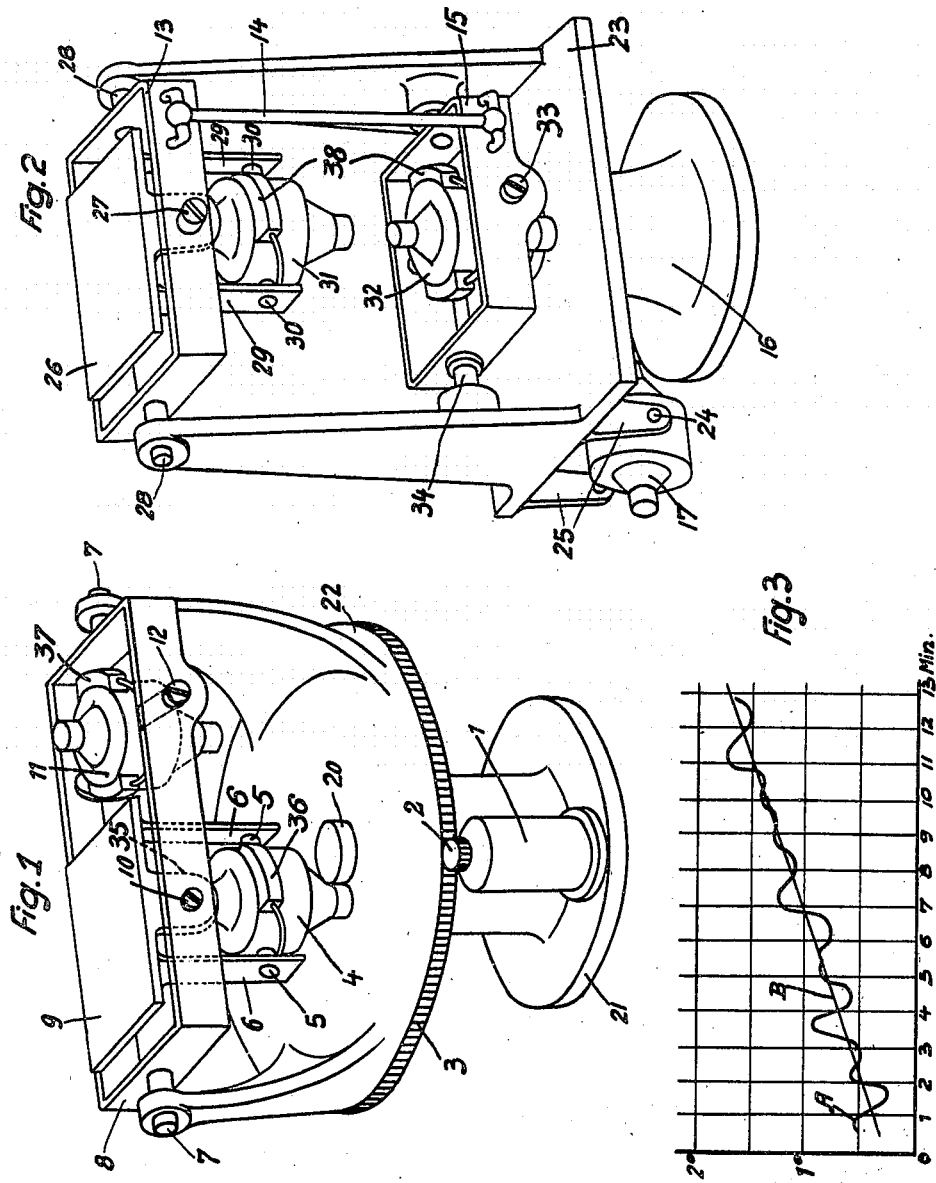

2,199,294

UNITED STATES PATENT OFFICE 2,199,294

GYROSCOPIC INSTRUMENT

Johannes Seligmann, Kiel, Germany, assignor to Anschütz & Co. G. m. b. H., Kiel-Neumuhlen, Germany Application July 7, 1939, Serial No. 283,291
In Germany May 4, 1935

3 Claims. (Cl. 33—204)

My invention relates to an instrument for maintaining a body in horizontal position. Systems of this type are known as "artificial horizons." They may be employed, for instance, to stabilize a mirror to be used in connection with a sextant.

The object of my invention is to provide an instrument of this type which combines simplicity of design with great accuracy in operation and which is very little affected by the North error.

Other objects of my invention will appear from the description following hereinafter.

I attain these and other objects by controlling the body to be stabilized from two gyroscope pendulums which have a normally perpendicular axis and are mounted for independent precessional movement. Each of the two gyroscope pendulums is constrained about one of its horizontal axes of suspension by a comparatively feeble restoring couple but is constrained about its other horizontal axis of suspension by a comparatively powerful couple. Therefore, the resulting precessional movement of the gyroscope pendulums is of elliptical character. The two axes of powerful constraint extend at right angles to one another and the body to be stabilized is so mounted as to partake in the oscillations of the gyroscopes about these axes. These oscillations are very small and, therefore, the body is very accurately maintained in horizontal position.

In the drawing, I have illustrated two preferred embodiments of my invention.

Fig. 1 is a perspective view of an instrument for stabilizing a horizontal mirror, Fig. 2 is a similar representation of a modification of the instrument shown in Fig. 1, and Fig. 3 is a diagram showing the accuracy of stabilization attainable by my invention.

As shown in Fig. 1, the base or holder 21 mounted on board ship has a trunnion 20 carrying a rotary platform 22 provided with peripheral gear teeth. These teeth are meshing with a pinion 2 secured to the armature of an electric motor 1 mounted on the base 21. The electric motor 1 is remote-controlled from a master compass and is operative to stabilize the platform 22 relative to the meridian by rotating the same in one direction whenever the course of the ship changes in the opposite direction.

The platform 22 is provided with two diametrically opposed brackets forming bearings for trunnions 7 of a normally horizontal gimbal frame 8. This frame is provided with two opposed pivots 10 having a common horizontal axis extending at right angles relative to that of the trunnions 7.

On the pivots 10 there is mounted a second gimbal frame comprised of a plate 9 formed with downwardly extending ears 35 forming bearings for the trunnions 10 and with two depending arms 6. In the lower ends of these arms, there are mounted diametrically opposed trunnions 5 of the gyroscope carrier 4.

The term "gyroscope carrier" as used in this specification and in the appended claims is intended to define the support of the bearings in which the axle of spinning gyroscope is journalled. The axis of these bearings is normally in upright position and extends at right angles to that of the trunnions 5.

The entire unit comprised of the gyroscope proper and its carrier 4 constitutes a so-called gyroscope pendulum. Its center of gravity is located beneath the axis of the trunnions 5. Therefore, this gyroscope pendulum is subject to a gravitational restoring couple tending to restore it to perpendicular position. As the distance of the axis 5—5 from the center of gravity of the gyroscope pendulum is but small, the gravitational restoring couple effective about this axis is but feeble. Another restoring couple acts at right angles thereto on the gyroscope pendulum about the axis of the pivots 10—10. The power of this couple is determined by the distance of the axis 10—10 from the center of gravity of the composite structure comprised of the gimbal frame 9, 6 and of the gyroscope pendulum. This center of gravity, however, is at a substantial distance beneath the primary axis 10—10 and, therefore, exerts a much more powerful couple about this axis than the couple acting about the secondary axis 5—5.

The gyroscope encased within the carrier 4 is provided with an electric driving motor in a known manner which need not be described. Moreover, the gyroscope pendulum is provided with suitable damping means diagrammatically indicated at 36. Since such damping means are well known in the art, they need not be described in detail.

The element which is to be stabilized relative to the horizon is constituted by the plate 9. This plate may be in form of a mirror which is to be kept in horizontal position irrespective of the movements of the ship for the purpose of astronomical observations.

The gimbal frame 8 is provided with another pair of pivots 12 extending parallel to the pivots 10 and at right angles to the pivots 5. On these pivots there is journalled a second gyroscope carrier 11 provided with a second gyroscope pendulum. This gyroscope pendulum is provided with individual damping means 37 and its center of gravity is located closely beneath the axis of the pivots 12.

It will appear from the foregoing description that the two gyroscope pendulums are capable of independent universal precessional movement since the carrier 4 may oscillate about the horizontal axes 5—5 and 10—10, while the other gyroscope carrier 11 may oscillate at the same time independently about the axes 12—12 and 7—7. The second gyroscope pendulum is subject to similar restoring couples as the first one. Thus, a comparatively feeble couple acts about the axis 12—12, while the gimbal frame 9, 6 and the carrier 4 mounted therein constitute a pendulum tending to hold the frame 8 horizontal and producing a powerful restoring couple about the axis 7—7.

It is an important feature of my invention that the means above described exert two different restoring couples about the two principal horizontal axes on each gyroscope carrier and that the primary axes 10—10 and 7—7 about which the more powerful couples are exerted extend at right angles to one another.

For an easier understanding of the operation it may be assumed that while both gyroscopes are in operation, the carriers 4 and 11 be displaced out of their perpendicular position. Then, their axes will perform a precessional movement along an ellipse. The ratio of the two principal axes of this ellipse is the inverse of the ratio of the roots from the restoring couples. The longer axis of the ellipse extends parallel to the axis 10—10. Hence, the gyroscope carrier 4 performs oscillations of a considerable amplitude about the secondary axis 5—5 but an oscillation of a very small amplitude about the primary axis 10—10.

Similar considerations apply to the other gyroscope carrier 11. The axis of the same performs a similar precessional movement along an elongated ellipse extending in parallel relationship to the axis 7—7. In other words, the amplitude of the precessional elevation about the secondary axis 12—12 is considerable, whereas the amplitude of oscillation of the frame 8 about the primary axis 7—7 is but very small.

The plate 9 constitutes a member which is so connected with the gimbal means as to partake in the precessional movement of the two gyroscope carriers 7 and 11 about the primary axes 10—10 and 7—7 only, but is not affected by the precessional oscillations about the secondary axes 12—12 and 5—5. Hence, the member 9 is stabilized relative to the horizon even though the two gyroscope carriers may perform considerable oscillations about the axes 5—5 and 12—12.

While it was assumed that the gyroscope pendulums had been initially displaced from their normal perpendicular position, it will be understood that, in practical operation, the pendulums will depart from their perpendicular position but very slightly under the effect of the unavoidable friction of suspension or under the effect of various other influences. The movements of the ship, however, will not affect the maintenance of the axes 10—10 and 5—5 in horizontal position.

The stabilizing forces holding these axes horizontal are much more powerful than the stabilizing couples that could be produced by a single gyroscope pendulum of the same average precessional period which would have a symmetrical suspension. Furthermore, the powerful restoring couples constraining the two gyroscope pendulums about the primary axes 10—10 and 7—7 will reduce the North error introduced by the rotation of the earth to a negligable factor which does not appreciably affect the accuracy of operation. If it should be desirable, however, to eliminate the North error, this could be easily done by displacing the common center of gravity of the gimbal frame 9, 6 and its gyroscope pendulum laterally relative to the axis 10—10, for instance, by imposing a lateral weight on the plate 9.

It is immaterial whether the gyroscope axes are accurately perpendicular, since it matters only that the axes 5—5 and 10—10 should be accurately maintained in horizontal position. This requirement would not be met unless the platform 3 were stabilized relative to the meridian, because a turn of the platform 3 through 90 degrees, for instance, would fully introduce the angles of departure of the gyroscope pendulums from perpendicular position into the position of the plate 9. This is the reason why I prefer to provide suitable means for preventing any turn of the platform 3 relative to the North-South line.

The embodiment illustrated in Fig. 2 differs from that shown in Fig. 1 primarily by the substitution for the single gimbal frame 8 of two separate frames 13 and 15 which are suitably coupled for common angular motion.

The vertical trunnion of the holder 16 is provided with anti-friction bearings on which a platform 23 is freely rotatably mounted. This platform is stabilized relative to the meridian. For this purpose, it is provided with two depending arms 25 providing horizontally opposed bearings for trunnions 24 secured to the carrier 17 of a horizontal gyroscope. This gyroscope has a comparatively large mass to produce a directive force which will hold the platform 23 at an invariable position relative to the North-South line.

The platform 23 is provided with two uprights constituting bearings for the trunnions 28, or 34 respectively, of two horizontal frames 13 and 15 arranged one above the other. The upper frame 13 is provided with opposed horizontal pivots 27 having a common axis extending at right angles to that of the trunnions 28. On the pivots 27 a gimbal frame is swingably mounted which is comprised of a mirror 26 and two depending arms 29. The lower ends of these arms provide bearings for the opposed horizontal trunnions 30 of a gyroscope pendulum. This pendulum is formed by a carrier 31 and a gyroscope journalled therein having a normally perpendicular axis. The center of gravity of the gyroscope pendulum is located closely beneath the horizontal axis of the trunnions 30, whereby a small gravitational restoring couple will be exerted on the gyroscope pendulum about this axis. The common center of gravity of the gimbal frame 26, 29 and the gyroscope pendulum is considerably spaced from and located beneath the axis of the pivots 27, whereby the restoring couple about these pivots will be comparatively powerful.

Within the lower frame 15 there is suspended a second gyroscope carrier 32. The trunnions 33 of this gyroscope carrier extend horizontally at right angles to the axis of the trunnions 34. The center of gravity of this gyroscope pendulum is located closely beneath the axis of the pivots 33.

Therefore, this gyroscope pendulum is subject to a small restoring couple about the trunnions 33.

The two frames 13 and 15 are coupled by a connecting rod 14 which will always maintain the two frames in parallel relationship. The gimbal frame 26, 29 and the gyroscope carrier 31 constitute a pendulum producing a considerable restoring couple about the axis 28—28. This couple is transferred by the connecting rod 14 to the gimbal frame 15. Hence, the gyroscope carrier 32 is constrained by a considerable restoring couple about the axis 34—34.

The operation is the same as that of the instrument illustrated in Fig. 1. Both gyroscope carriers 31 and 32 are provided with suitable damping means indicated at 38. These damping means will gradually reduce, within a brief period of time, any precessional oscillations that might occur when the instrument is started or when it is affected in operation by any disturbing influences.

When the instrument has been started and when precessional oscillations have been damped, the mirror 9, or 26 respectively, may be used in the same manner as the mirror of any other artificial horizon for observation by means of a sextant or octant. The remaining oscillations that might occur as a result of disturbances, such as changes of the course of the ship, have such a high frequency that they may be eliminated by repeated observations and by computing the average of the results. Practical operation during rough weather has shown that the results of observation were approximately located on a sinus curve having an amplitude of 6–8 minutes and a period of only about 90 seconds, and that the instrument came to rest within about five minutes from its start so that the observations could begin.

As the frame carrying the mirror 9 or 26 is maintained in horizontal position with great accuracy, it may be employed as the commanding member of a remote-controlled stabilizing system whereby instruments or guns mounted on the ship at a distance from the instrument may be stabilized about one or both horizontal axes. In this event, the frame 9 or 26 would control the transfer elements and would not be equipped with a mirror.

The movements of a member stabilized in such a manner relative to the ship may be registered by suitable instruments in a known manner. It is also possible, however, to measure the motion of the stabilized member with relationship to the movement of members stabilized by other means, such as other gyroscopic instruments having a very extended or indefinite period of oscillation. Thus, Fig. 3 shows a diagram in which the abscissa indicates the time and the ordinate indicates the angle of oscillation of a curve $a$ registered by a differential instrument measuring the difference in position of the gimbal frame 9 of Fig. 1 and of a slowly oscillating gyroscopic instrument relative to the ship. The line $b$ indicates the zero line which may be computed or estimated. This diagram shows very clearly the accuracy of operation of my invention. Moreover, it will be understood from Fig. 3 that my improved instrument may be employed to measure the speed at which the slowly oscillating gyroscopic instrument departs from the true horizon.

My invention is capable of numerous modifications which will readily occur to anyone skilled in the art. Thus, the more powerful restoring couple about the primary axes 7—7 and 10—10, or 34—34 and 27—27 respectively, could be produced by other means than gravitational means, for instance, by springs.

What I claim is:

1. In an instrument of the character described, the combination comprising a holder rotatable about a normally vertical axis, means rotating said holder to stabilize the same relative to the meridian, a gimbal frame pivotally mounted on said holder about a horizontal axis, a pendulum connected with said gimbal frame and exerting a powerful gravitational restoring couple about said axis thereon, a gyroscope pendulum having a normally perpendicular spin axis and being pivotally mounted in said gimbal frame about an axis extending closely above the center of gravity of said gyroscope pendulum at substantially right angles to said first-mentioned axis, the first pendulum being constituted by a second gimbal frame pivotally supporting a second gyroscope pendulum, the pivots of said second gimbal frame being located in different horizontal planes above the center of gravity of said second gyroscope pendulum, the upper of said pivots being located in said first-mentioned gimbal frame and extending at right angles to said first-mentioned horizontal axis thereof.

2. In an instrument of the character described, an element mounted to turn about a horizontal axis, a second element carried by said first element to turn with respect thereto about a second horizontal axis perpendicular to said first axis, and two gyroscopic means each comprising a case having a rotor therein for spinning about a vertical axis, means mounting the first case to turn about a third horizontal axis perpendicular to the axis of the first element and the second case to turn about a fourth horizontal axis perpendicular to the axis of said second element, said first and second cases having freedom of movement with respect to said first and second elements, respectively, about said third and fourth horizontal axes only, said first case being connected to said first element so that said first case moves equally and synchronously as the first element pivots about said first horizontal axis, said second element representing an artificial horizon.

3. An instrument of the character described, including an element mounted to turn about a normally horizontal axis, a second element pivoted to said first element to turn with respect thereto about a second horizontal axis perpendicular to the first-mentioned axis, gyroscopic means comprising a case having a rotor therein for spinning about a normally vertical axis, said case being pivotally supported by the first-mentioned element for turning with respect thereto only about an axis parallel with respect to the second horizontal axis, second pivotally supported gyroscopic means comprising a case having a rotor therein for spinning about a normally vertical axis, and means connecting said second case to said second element whereby said second case and second element pivot together about at least one horizontal axis perpendicular to the first-mentioned axis and whereby said second case pivots relative to said second element about a second horizontal axis perpendicular to the last-named axis, said second element representing an artificial horizon.

4. In an instrument of the character described, an element mounted to turn about a horizontal axis, a second element carried by said first element to turn with respect thereto about a second horizontal axis perpendicular to said first axis, and two gyroscopic means each comprising a case having a rotor therein for spinning about a vertical axis, means mounting the first case to turn about a third horizontal axis perpendicular to the axis of the first element and the second case to turn about a fourth horizontal axis perpendicular to the axis of said second element, said first and second cases having freedom of movement with respect to said first and second elements, respectively, about said third and fourth horizontal axes only, said first case being connected to said first element so that said first case moves equally and synchronously as the first element pivots about said first horizontal axis, said second element representing an artificial horizon, said third and fourth horizontal axes being in close proximity to and slightly above the centers of gravity of said gyroscopic means, respectively.

5. In an instrument of the character described, an element mounted to turn about a horizontal axis, a second element carried by the first element to turn with respect thereto about a second horizontal axis perpendicular to the first axis, first gyroscopic means comprising a case having a rotor therein for spinning about a vertical axis, means mounting the case of the first gyroscopic means to turn with respect to said first element only about a third horizontal axis parallel to said second horizontal axis, said third horizontal axis being in close proximity to and slightly above the center of gravity of said first gyroscopic means, said case being connected to said first element so that said case moves equally and synchronously as the first element moves about said first horizontal axis, second gyroscopic means comprising a case having a rotor therein for spinning about a vertical axis, and means mounting the case of said second gyroscopic means on said second element substantially below said second horizontal axis to turn with respect to said second element only about a fourth horizontal axis parallel to said first axis.

6. In an instrument of the character described, an element mounted to turn about a horizontal axis, a second element carried by the first element to turn with respect thereto about a second horizontal axis perpendicular to the first axis, first gyroscopic means comprising a case having a rotor therein for spinning about a vertical axis, means mounting the case of the first gyroscopic means to turn with respect to said first element only about a third horizontal axis parallel to said second horizontal axis, said third horizontal axis being in close proximity to and slightly above the center of gravity of said first gyroscopic means, second gyroscopic means comprising a case having a rotor therein for spinning about a vertical axis, and means mounting the case of said second gyroscopic means on said second element substantially below said second horizontal axis to turn with respect to said second element only about a fourth horizontal axis parallel to said first axis, said fourth horizontal axis being in close proximity to and slightly above the center of gravity of said second gyroscopic means.

7. In an instrument of the character described, a holder rotatable about a normally vertical axis, means rotating said holder to stabilize the same relative to the meridian, an element mounted on said holder to turn with respect thereto about a horizontal axis, a second element mounted on the first element to turn with respect thereto about a second horizontal axis perpendicular to said first axis, and two gyroscopic means each comprising a case having a rotor therein for spinning about a vertical axis, means mounting the first case on said first element to turn with respect thereto about a third horizontal axis perpendicular to the first axis, and means mounting the second case on said second element to turn with respect thereto about a fourth horizontal axis perpendicular to the second axis.

8. An instrument of the character described, including an element mounted to turn about a horizontal axis, a second element carried by said first element to turn with respect thereto about a second horizontal axis perpendicular to the first-mentioned axis, a third element mounted to turn about a horizontal axis parallel to said first-mentioned axis, gyroscopic means comprising a case having a rotor therein for spinning about a vertical axis, means mounting the case of said gyroscopic means on said third element so that the said case has freedom of motion with respect to said third element only about a third horizontal axis parallel to said second horizontal axis, second gyroscopic means comprising a case having a rotor therein for spinning about a vertical axis, means mounting the case of said second gyroscopic means on said second element so that the case of said second gyroscopic means has freedom of motion with respect to said second element only about a fourth horizontal axis parallel to said first-mentioned axis, and means coupling said first and third elements for maintaining said first and third elements in substantially parallel relationship, said second element representing an artificial horizon.

JOHANNES SELIGMANN.